(12) United States Patent
Mota et al.

(10) Patent No.: US 11,705,001 B2
(45) Date of Patent: Jul. 18, 2023

(54) DEVICE AND COMPUTER PROGRAM PRODUCT FOR ROUTE PLANNING FOR A VEHICLE

(71) Applicant: Bayerische Motoren Werke Aktiengesellschaft, Munich (DE)

(72) Inventors: Bernardo Mota, Munich (DE); William Resende, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 563 days.

(21) Appl. No.: 16/808,894

(22) Filed: Mar. 4, 2020

(65) Prior Publication Data

US 2020/0202715 A1 Jun. 25, 2020

Related U.S. Application Data

(63) Continuation of application No. PCT/EP2018/063059, filed on May 18, 2018.

(30) Foreign Application Priority Data

Sep. 7, 2017 (DE) ..................... 10 2017 215 792.5

(51) Int. Cl.
*B60L 53/60* (2019.01)
*G08G 1/0968* (2006.01)
(Continued)

(52) U.S. Cl.
CPC ... *G08G 1/096844* (2013.01); *G01C 21/3469* (2013.01); *G01C 21/3476* (2013.01);
(Continued)

(58) Field of Classification Search
CPC .......... G08G 1/096844; G08G 1/0125; G08G 1/096816; G08G 1/096827;
(Continued)

(56) References Cited

U.S. PATENT DOCUMENTS 9,103,686 B2 * 8/2015 Pettersson ............... B60L 1/003
9,199,548 B2 * 12/2015 Hyde et al. ............. B60L 55/00
(Continued)

FOREIGN PATENT DOCUMENTS

DE 10 2011 015 777 A1 10/2012
DE 10 2015 203 149 A1 8/2015
(Continued)

OTHER PUBLICATIONS

"Bharatiraja Chokkalingam et al., Real-Time Forecasting of EV Charging Station Scheduling for Smart Energy Systems, Mar. 16, 2017, Preprints" (Year: 2017).*
(Continued)

*Primary Examiner* — Cuong H Nguyen
(74) *Attorney, Agent, or Firm* — Crowell & Moring LLP

(57) ABSTRACT

A method determines an anticipated occupation of charging points and a charging strategy for a specified route. The method provides traffic data which is representative for the current traffic density on the route specified. An anticipated occupation of charging points along the specified route can be determined on the basis of the traffic data. A charging strategy can be determined on the basis of the traffic data and the determined anticipated occupation of charging points. The provision of information regarding a charging strategy to a driver allows the time required for the specified route to be reduced.

19 Claims, 2 Drawing Sheets

(51) Int. Cl.
  *G01C 21/34* (2006.01)
  *G06Q 30/0283* (2023.01)
  *G08G 1/01* (2006.01)
  *G01C 21/36* (2006.01)

(52) U.S. Cl.
  CPC ..... *G01C 21/3492* (2013.01); *G01C 21/3679* (2013.01); *G06Q 30/0283* (2013.01); *G08G 1/0125* (2013.01); *G01C 21/3682* (2013.01); *G01C 21/3685* (2013.01)

(58) Field of Classification Search
  CPC ............ G01C 21/3469; G01C 21/3476; G01C 21/3492; G01C 21/3679; G01C 21/3682; G01C 21/3685; G06Q 30/0283; G06Q 50/06; G06Q 10/047; B60W 2510/242
  USPC ........................................................ 701/118
  See application file for complete search history.

(56) References Cited

U.S. PATENT DOCUMENTS

| | | | | |
|---|---|---|---|---|
| 10,699,305 | B2* | 6/2020 | Ricci .................... | G01S 13/867 |
| 2011/0224900 | A1* | 9/2011 | Hiruta ................ | G01C 21/3469 |
| | | | | 701/533 |
| 2011/0225105 | A1* | 9/2011 | Scholer .................. | B60L 55/00 |
| | | | | 320/109 |
| 2011/0288765 | A1* | 11/2011 | Conway ........... | G08G 1/096816 |
| | | | | 701/533 |
| 2012/0123670 | A1* | 5/2012 | Uyeki .................. | G01C 21/165 |
| | | | | 707/802 |
| 2012/0158229 | A1* | 6/2012 | Schaefer ............... | B60L 53/665 |
| | | | | 320/109 |
| 2012/0290506 | A1* | 11/2012 | Muramatsu ........ | G01C 21/3679 |
| | | | | 701/400 |
| 2013/0158870 | A1* | 6/2013 | Van Wiemeersch ........................ |
| | | | | G01C 21/3469 |
| | | | | 701/527 |
| 2013/0179057 | A1* | 7/2013 | Fisher .................... | B60L 53/66 |
| | | | | 701/1 |
| 2013/0261953 | A1 | 10/2013 | Kiyama et al. | |
| 2013/0345945 | A1* | 12/2013 | Fischer .................. | B60L 53/53 |
| | | | | 701/102 |
| 2014/0052373 | A1 | 2/2014 | Hoch et al. | |
| 2014/0129139 | A1* | 5/2014 | Ellison .................... | B60L 53/67 |
| | | | | 701/533 |
| 2014/0172288 | A1* | 6/2014 | Gutman ............. | G01C 21/3469 |
| | | | | 701/400 |
| 2015/0025727 | A1* | 1/2015 | Engman ............. | G01C 21/3407 |
| | | | | 903/930 |
| 2015/0045985 | A1* | 2/2015 | Yenamandra ...... | G01C 21/3469 |
| | | | | 701/1 |
| 2015/0241233 | A1* | 8/2015 | Loftus et al. ...... | G01C 21/3682 |
| | | | | 701/410 |
| 2015/0291047 | A1 | 10/2015 | Saito et al. | |
| 2016/0003621 | A1* | 1/2016 | Koenig .............. | G01C 21/3694 |
| | | | | 701/31.4 |
| 2016/0076899 | A1 | 3/2016 | Macneille et al. | |
| 2016/0332585 | A1 | 11/2016 | Baverstock | |
| 2016/0334233 | A1* | 11/2016 | Baverstock ........... | B60W 10/18 |
| 2017/0030728 | A1* | 2/2017 | Baglino .............. | G01C 21/3469 |
| 2018/0037136 | A1* | 2/2018 | Nelson .................... | B60L 53/51 |
| 2018/0143035 | A1* | 5/2018 | Ricci .................. | G06Q 30/0266 |
| 2018/0238698 | A1* | 8/2018 | Pedersen .............. | G05D 1/0088 |
| 2019/0016329 | A1* | 1/2019 | Park .................... | B60L 15/2045 |
| 2019/0107406 | A1* | 4/2019 | Cox ........................ | G01S 19/42 |
| 2019/0202315 | A1* | 7/2019 | Wilding ............. | G01C 21/3407 |
| 2019/0316924 | A1* | 10/2019 | Morgan-Brown .......................... |
| | | | | G01C 21/3697 |

FOREIGN PATENT DOCUMENTS

DE  10 2015 114 806 A1   3/2016
WO  WO 2013024484 A1 *  2/2013  ........... G01R 31/382

OTHER PUBLICATIONS

S. Schoenberg and F. Dressier, "Reducing Waiting Times at Charging Stations with Adaptive Electric Vehicle Route Planning," in IEEE Transactions on Intelligent Vehicles, doi: 10.1109/TIV.2022.3140894. (Year: 2022).*

Real-Time Forecasting of EV Charging Station Scheduling for Smart Energy Systems; Mrs. V. Anitha Moses, Priya S, Ramys S, Sangeetha N.; International Research Journal of Engineering and Technology (IRJET) e-ISSN: 2395-0056 vol. 05 Issue: 03 | Mar. 2018 www.irjet.net (Year: 2018).*

S. Schoenberg, D. S. Buse and F. Dressier, "Coordinated Electric Vehicle Re-Charging to Reduce Impact on Daily Driving Schedule," 2021 IEEE Intelligent Vehicles Symposium (IV), 2021, pp. 1180-1187, doi: 10.1109/IV48863.2021.9575517. (Year: 2021).*

A. Gusrialdi, Z. Qu and M. A. Simaan, "Distributed Scheduling and Cooperative Control for Charging of Electric Vehicles at Highway Service Stations," in IEEE Transactions on Intelligent Transportation Systems, vol. 18, No. 10, pp. 2713-2727, Oct. 2017, doi: 10.1109/TITS.2017.2661958. (Year: 2017).*

"Assessing the Impact of Electric Vehicles Penetration on Highway Revenue" Mbiaji, Grace. South Carolina State University ProQuest Dissertations Publishing, 2019.28678802 (Year: 2019).*

International Search Report (PCT/ISA/210) issued in PCT Application No. PCT/EP2018/063059 dated Sep. 12, 2018 with English translation (six (6) pages).

German-language Written Opinion (PCT/ISA/237) issued in PCT Application No. PCT/EP2018/063059 dated Sep. 12, 2018 (eight (8) pages).

German-language Search Report issued in German Application No. 102017215792.5 dated Apr. 11, 2018 with partial English translation (12 pages).

* cited by examiner

DEVICE AND COMPUTER PROGRAM PRODUCT FOR ROUTE PLANNING FOR A VEHICLE

CROSS REFERENCE TO RELATED APPLICATIONS

This application is a continuation of PCT International Application No. PCT/EP2018/063059, filed May 18, 2018, which claims priority under 35 U.S.C. § 119 from German Patent Application No. 10 2017 215 792.5, filed Sep. 7, 2017, the entire disclosures of which are herein expressly incorporated by reference.

BACKGROUND AND SUMMARY OF THE INVENTION

The invention relates to a method, a device, a computer program and a computer program product for route planning for a vehicle, wherein an expected occupancy of charging stations along a predefined route is determined.

It is customary nowadays for vehicles to be equipped with route planners that can be used to find a route between a starting point and a journey destination.

The problem addressed by the invention is that of providing a method for route planning for a vehicle and also a corresponding device, a computer program and a computer program product which contribute to reducing the travel duration for a predefined route.

In accordance with a first aspect, the invention relates to a method for route planning for a vehicle. In the method, traffic data that are representative of a current traffic density of a predefined route are provided. An expected occupancy of charging stations along the route is determined depending on the traffic data, wherein the expected occupancy is an occupancy of the charging stations at a calculated point in time of arrival of the vehicle at the respective charging station. A charging strategy is determined depending on the traffic data and the determined expected occupancy of the charging stations, said charging strategy being representative of information concerning a charging process of the vehicle at one or more of the charging stations along the route. Subsequently, depending on the charging strategy determined, information concerning the charging strategy is provided for a driver.

The ever increasing development of plug-in hybrid and electric vehicles and the associated demand for charging infrastructure can result in an inhomogeneous occupancy of charging stations. That means that some charging stations, such as e.g. charging stations situated directly at an interstate highway, may have a long queue, while other charging stations are unoccupied or have only low occupancy.

The long waiting time results in a long travel duration and could be disadvantageous for the acceptance of electric vehicle technology.

In the method, therefore, the charging strategy is determined depending on traffic data and the determined expected occupancy of charging stations. The provision of the information concerning the charging strategy to the driver can thereupon make it possible to reduce the travel duration for a specified route. The route can be a route specified by the driver, for example, which can be characterized by a starting point and an end point. For example, the starting point of the route can be a current position of a vehicle and the end point of the route can be a journey destination specified by the driver. The vehicle can be a plug-in hybrid vehicle or an electric vehicle, for example.

The provision of traffic data, such as e.g. data concerning the current traffic density, for the predefined route makes it possible to determine an expected occupancy of charging stations along the route. The current traffic density of a road contains for example information concerning a current course of traffic and/or number of vehicles on a road and can accordingly be correlated with the expected occupancy of the charging stations. Furthermore, the number of plug-in hybrid and electric vehicles situated on the specified route can be relevant for example for determining the expected occupancy of the charging stations along the route. Consequently, in addition data concerning the number of plug-in hybrid and electric vehicles situated on the specified route can be provided and be used for determining the expected occupancy of the charging stations and/or the charging strategy. The charging stations can be either charging stations situated directly on the roads of the route and/or charging stations situated within a predetermined distance from the relevant roads. The charging strategy for this route can be determined depending on the traffic data provided and the expected occupancy of the charging stations. The charging strategy comprises for example information concerning a location, wherein the location is for example a proposal for a location at which a vehicle battery is intended to be charged. The charging strategy can for example also comprise information concerning a battery charging duration, wherein the battery charging duration is for example a proposal for a duration of electrical charging of the vehicle battery. Furthermore, the charging strategy can comprise for example information concerning a number of charging processes, wherein the number of charging processes can be for example a proposal for a number of charging processes of the vehicle battery for the specified route. Depending on the traffic data and the expected occupancy of the charging stations, the charging strategy can be updated for example during the route. The provision of these items of information to the driver can make it possible to reduce the travel duration to the predefined destination.

The information concerning the charging strategy that is provided for the driver contains for example an indication concerning time-efficient charging of the vehicle battery for the predefined route and the travel duration for the route can be reduced as a result. The reduction of the travel duration may result in better customer satisfaction and a better acceptance of electric vehicle technology. The charging strategy helps the driver for example to find charging stations having a low occupancy along the route and can result in a reduction of the burden on the charging stations and/or a homogeneous occupancy of the charging stations. The homogeneous occupancy of the charging stations enables a balanced and/or more readily calculable electrical energy distribution of the charging stations.

In one advantageous configuration in accordance with the first aspect, data concerning a historical traffic density are provided, wherein the data concerning the historical traffic density comprise information concerning a traffic density along the route at past points in time. Furthermore, the expected occupancy of the charging stations and the charging strategy are determined depending on the data concerning the historical traffic density.

The data concerning the historical traffic density can comprise for example information concerning a historical course of traffic and/or a traffic density pattern of a road. The traffic density pattern can be representative e.g. of a traffic density at different times of the day and/or on work days and/or on holidays. The more traffic data stored, the more comprehensive the data concerning the historical traffic density can be. The historical traffic density can be representative of a traffic density expected at the point in time of arrival of the vehicle at a charging station and enables a better prediction of the expected occupancy of the charging stations along the route. This results in a more efficient charging strategy and contributes to reducing the travel duration.

In a further advantageous configuration in accordance with the first aspect, weather data that are representative of a weather situation along the route are provided. Furthermore, the expected occupancy of the charging stations and the charging strategy are determined depending on the weather data.

The weather data can comprise for example information concerning a current weather situation and/or a weather situation expected at the point in time of arrival of the vehicle to a charging station. The weather situation can influence for example the traffic density and/or vehicle speed. The provision of weather data can therefore enable a better determination of the expected occupancy of the charging stations along the route and a more efficient charging strategy.

In a further advantageous configuration in accordance with the first aspect, data concerning a current location and/or consumption and/or speed and/or charging status of the vehicle are provided. Furthermore, the expected occupancy of the charging stations and the charging strategy are determined depending on the data concerning the current location and/or consumption and/or speed and/or charging status of the vehicle.

The data concerning the current location and/or consumption and/or speed and/or charging status of the vehicle can influence for example the range of the vehicle and the point in time of arrival of the vehicle at the charging stations. In this case, the charging status can be representative of the charging status of the vehicle battery. These data are relevant for example to a calculation of a point in time of arrival of the vehicle at the charging stations and/or of a duration of electrical charging at the respective charging stations. The provision of the data concerning the current location and/or consumption and/or speed and/or charging status of the vehicle can therefore enable a better determination of the expected occupancy of the charging stations and a more efficient charging strategy.

In a further advantageous configuration in accordance with the first aspect, data concerning a current occupancy of the charging stations along the route are provided. Furthermore, the expected occupancy of the charging stations and the charging strategy are determined depending on the data concerning the current occupancy of the charging stations.

The current occupancy of the charging stations can be relevant to the determination of the expected occupancy of the charging stations. By way of example, the current occupancy of charging stations situated in the vicinity of the vehicle can be correlated with the expected occupancy thereof. By way of example, charging stations which are situated in the vicinity of the vehicle and have a low current occupancy can be preferred for the determination of the charging strategy. The data concerning the current occupancy of the charging stations can enable a better determination of the expected occupancy of the charging stations and/or a more efficient charging strategy.

In a further advantageous configuration in accordance with the first aspect, depending on the data concerning the current occupancy of the charging stations, information concerning the current occupancy of the charging stations is provided for the driver.

The information concerning the current occupancy of the charging stations can facilitate the selection of the nearest charging point for the driver. This information is relevant for example if the driver would like to charge the vehicle immediately.

In a further advantageous configuration in accordance with the first aspect, data concerning a historical occupancy of the charging stations along the route are provided, wherein the data concerning the historical occupancy comprise information concerning an occupancy of the charging stations at past points in time. Furthermore, the expected occupancy of the charging stations and the charging strategy are determined depending on the data concerning the historical occupancy of the charging stations.

The data concerning the historical occupancy of the charging stations can contain information concerning an occupancy pattern of the charging stations such as e.g. the occupancy during different times of the day and/or during holidays and/or during work days. The more data that can be stored concerning the current occupancy of the charging stations, the more comprehensive the data concerning the historical traffic density can be. The expected occupancy of a charging station can be correlated with the historical occupancy. By way of example, charging stations having a low historical occupancy at the point in time of arrival of the vehicle can be preferred for the determination of the charging strategy. The data concerning the historical occupancy of the charging stations can enable a better determination of the expected occupancy of the charging stations and the charging strategy.

In a further advantageous configuration in accordance with the first aspect, data concerning a charging power of the charging stations along the route are provided. Furthermore, the expected occupancy of the charging stations and the charging strategy are determined depending on the data concerning the charging power of the charging stations.

The data concerning the charging power of the charging stations can contain for example information concerning a speed of the charging process of vehicles at the charging stations. The charging power of the charging stations can vary between 3 kW and 300 kW, for example. The charging power of the charging stations can be increased further in the future. Charging stations having a high charging power that are situated on roads having a high traffic density can have a high expected occupancy, for example. By way of example, charging stations having a high charging power and a low expected occupancy can be preferred for the charging strategy.

In a further advantageous configuration in accordance with the first aspect, data concerning a current electricity price of the charging stations are provided. Furthermore, the expected occupancy of the charging stations and the charging strategy are determined depending on the data concerning the current electricity price of the charging stations.

The data concerning a current electricity price of the charging stations can contain for example information concerning a current price of the electricity of the charging stations, for example (€/kWh). Different charging stations can have different electricity prices, for example. The electricity price of a charging station can vary over time, for example. Charging stations having a high electricity price can have a low expected occupancy, for example. By way of example, charging stations having a low electricity price can be preferred for the charging strategy.

In a further advantageous configuration in accordance with the first aspect, depending on the data concerning the current electricity price of the charging stations, information concerning the current electricity price of the charging stations is provided for the driver.

The information concerning the current electricity price of the charging stations enables the driver to choose between a fastest route or a route having the most favorable cost.

In a further advantageous configuration in accordance with the first aspect, depending on the expected occupancy determined, information concerning the expected occupancy of the charging stations is provided for the driver.

The information concerning the expected occupancy of the charging stations facilitates the decision for a charging point along the route for the driver and is relevant for example if the driver would like to charge the vehicle only at a later point in time.

In accordance with a second aspect, the invention relates to a device for route planning for a vehicle, wherein the device is configured to carry out the method in accordance with the first aspect. The device comprises a data processing device, for example, which is coupled to the vehicle and the charging stations in terms of signaling.

In accordance with a third aspect, the invention relates to a computer program for route planning for a vehicle. The computer program is configured to carry out the method in accordance with the first aspect.

In accordance with a fourth aspect, the invention relates to a computer program product comprising executable program code, wherein the program code, upon execution by a data processing device, carries out the method in accordance with the first aspect.

The computer program product comprises in particular a medium which is readable by the data processing device and on which the program code is stored.

Other objects, advantages and novel features of the present invention will become apparent from the following detailed description of one or more preferred embodiments when considered in conjunction with the accompanying drawings.

Elements of identical design or function are identified by the same reference signs throughout the figures.

DETAILED DESCRIPTION OF THE DRAWINGS

Figure 1:
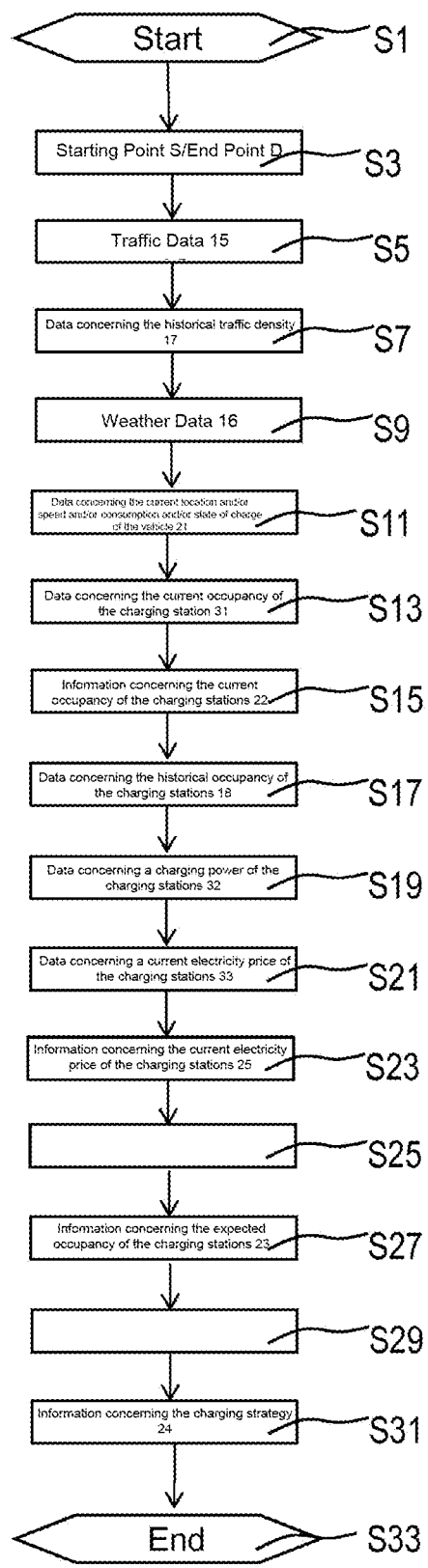
FIG. 1 is a flow diagram of a program for route planning for a vehicle.
Figure 2:
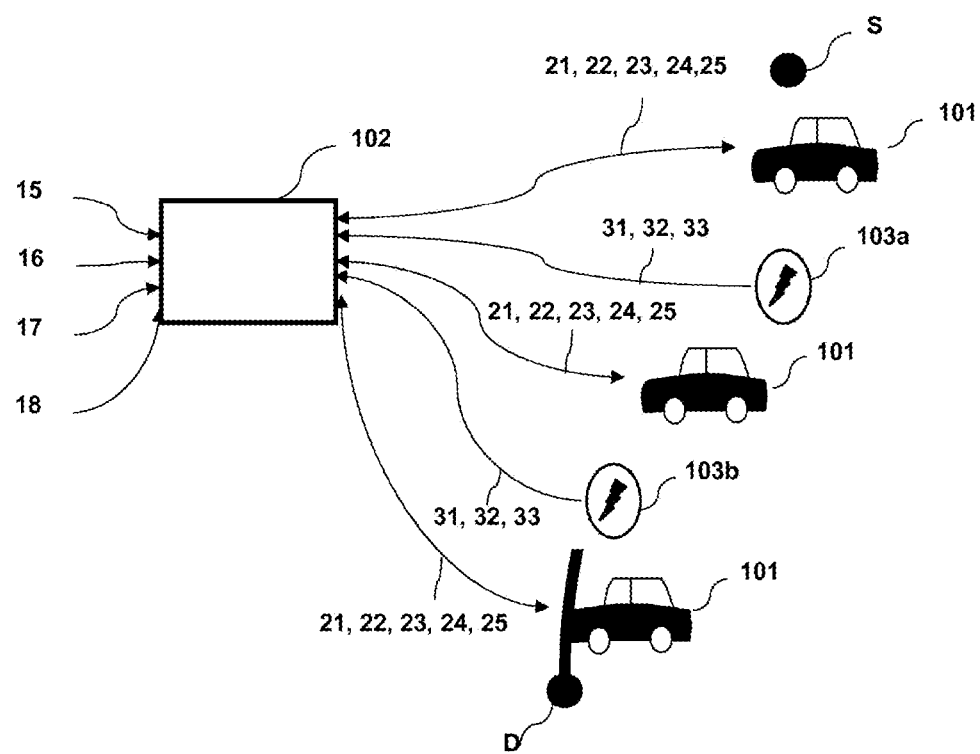
FIG. 2 shows a system for route planning for a vehicle.

FIG. 1 shows a flow diagram of a program for route planning for a vehicle 101 (see FIG. 2).

A device 102 (see FIG. 2) is configured for example to execute the program. For this purpose, the device 102 comprises in particular a computing unit, a program and data memory, and also one or more communication interfaces, for example. The program and data memory and/or the computing unit and/or the communication interfaces can be embodied in one structural unit and/or in a manner distributed among a plurality of structural units.

The device 102 can also be referred to as a device for route planning for a vehicle 101.

The device 102 is embodied for example in a central system. The central system can represent a backend, for example, which can communicate with vehicles 101 of a vehicle population and charging stations 103a, 103b of a charging infrastructure. The central system can be for example a predictive system based on artificial intelligence.

Alternatively or additionally, the device 102 is embodied in a vehicle 101 and/or in a mobile unit, such as a smartphone.

In particular, the program for route planning for a vehicle 101 is stored on the program and data memory of the device 102.

The flow diagram in FIG. 1 is explained in greater detail below.

The program is started in a step S1, in which variables are initialized, for example. The program is subsequently continued in a step S3.

In step S3, data concerning a specified route are provided. These data comprise for example a starting point S, which represents for example the current position of the vehicle 101, and an end point D, which can represent for example a journey destination of the specified route, as selected by the driver. The program is subsequently continued in a step S5.

In step S5, traffic data 15 that are representative of a current traffic density of the specified route are provided. The current traffic density can vary at different sections of the route and is relevant for example to the determination of the expected occupancy of charging stations 103a, 103b in the vicinity of the current location of the vehicle 101. The program is subsequently continued in a step S7.

In step S7, data concerning the historical traffic density 17 are provided, wherein the data concerning the historical traffic density 17 comprise information concerning a traffic density along the route at past points in time. The historical traffic density of a road can comprise information concerning a traffic density pattern of the road for example during specific times of the day or on holidays. The more traffic data 15 stored, the more comprehensive the data concerning the historical traffic density 17 become. The program is subsequently continued in a step S9.

In step S9, weather data 16 that are representative of a weather situation along the route are provided. The program is subsequently continued in a step S11.

In step S11, data concerning a current location and/or consumption and/or speed and/or charging status of the vehicle 21 are provided. The device 102 can process data concerning a current location and/or consumption and/or speed and/or charging status of the vehicle 21 from a plurality of vehicles 101 of the vehicle population. In this case, the charging status can be representative of the charging status of the vehicle battery. These data can be relevant to the search for charging stations 103a, 103b in the vicinity of the vehicle 101 and/or the determination of the range of the vehicle battery and/or the prediction of the point in time of arrival of the vehicle 101 at the respective charging stations 103a, 103b. The program is subsequently continued in a step S13.

In step S13, data concerning the current occupancy of the charging stations 31 are provided. The communication between the charging stations 103 and the device 102 makes it possible to acquire data regarding the current occupancy of the charging stations 103a, 103b. For charging stations situated in the vicinity of the vehicle 101, a rather negligible difference between the current occupancy and the expected occupancy of the charging stations should be expected. The program is subsequently continued in a step S15.

In step S15, depending on the data concerning the current occupancy of the charging stations, information concerning the current occupancy of the charging stations 22 is provided for the driver. The information concerning the current occupancy of the charging stations 22 makes it easier for the driver to select the nearest charging point, for example if the driver would like to charge the vehicle 101 immediately.

This information can be displayed for example as a graphic for a dashboard and/or a central display unit and/or a head-up display and/or a smartphone. The program is subsequently continued in a step S17.

In step S17, data concerning the historical occupancy of the charging stations 18 are provided, wherein the data concerning the historical occupancy of the charging stations 18 comprise information concerning an occupancy of the charging stations 103a, 103b along the route at past points in time. Data concerning the current occupancy of the charging stations 31 over time can be stored for this purpose. The more data that are stored concerning the current occupancy of the charging stations 31, the more accurate and more reliable the data concerning the historical occupancy of the charging stations 18 become. The data concerning the historical occupancy of the charging stations 18 can be provided by a database, for example. The program is subsequently continued in a step S19.

In step S19, data concerning a charging power of the charging stations 32 along the route are provided. The communication between the charging stations 103 and the device 102 makes it possible to acquire data regarding the charging power of the charging stations 103a, 103b. By way of example, charging stations 103a, 103b that are situated on roads with a high traffic density and have a high charging power can have a high expected occupancy. The program is subsequently continued in a step S21.

In step S21, data concerning a current electricity price of the charging stations 33 along the route are provided. The communication between the charging stations 103 and the device 102 makes it possible to acquire data regarding the current electricity price of the charging stations 103a, 103b. By way of example, charging stations 103a, 103b having a high electricity price can have a low expected occupancy. The program is subsequently continued in a step S23.

In step S23, depending on the data concerning the current electricity price of the charging stations 33, information concerning the current electricity price of the charging stations 25 is provided for the driver. The information concerning the current electricity price 25 can make it possible for the driver to select charging stations having a favorable electricity price. The program is subsequently continued in a step S25.

In step S25, data concerning the expected occupancy of the charging stations 103a, 103b are determined. The traffic data 15 can be used for determining the expected occupancy of charging stations 103a, 103b. Further data, for example the data concerning the historical traffic density 17 can be used for a better determination of the expected occupancy. By way of example, if a charging station 103a, 103b has a high historical traffic density on work days between 7 am and 9 am, it is likely that the expected occupancy in this period of time will also be high. Since the weather situation can influence the traffic density, it is advantageous to take account of weather data 16 for the determination of the expected occupancy of the charging stations 103a, 103b. By way of example, if it is snowing on a section of the specified route according to weather data 16, it is likely that the traffic density and accordingly the expected occupancy of the charging stations 103a, 103b on this section will be high. The data concerning the current location and/or consumption and/or speed and/or battery charging status of the vehicle 21 can also be used for a better determination of the expected occupancy of charging stations 103a, 103b. These data can influence the point in time of arrival of the vehicle 101 at the charging stations 103a, 103b and/or the charging time of the vehicle battery at the respective charging stations 103a, 103b. Taking account of the data concerning the current occupancy of the charging stations 31 and/or the data concerning the historical occupancy of the charging stations 18 can also enable a better determination of the expected occupancy of the charging stations 103a, 103b. For charging stations situated in the vicinity of the vehicle 101, the expected occupancy can be correlated with the current occupancy. The data concerning the historical occupancy of the charging stations 18 contain for example information concerning an occupancy pattern of the charging stations 103a, 103b, for example during different times of the day and/or on work days and/or on holidays. If a charging station 103a, 103b has a high historical occupancy at the weekend, for example, it is likely that the expected occupancy at the weekend will also be high. The data concerning the charging power of the charging stations 32 can enable a better determination of the expected occupancy of the charging stations 103a, 103b. By way of example, charging stations 103a, 103b that are situated on roads with a low traffic density and have a high charging power can have a low expected occupancy. The data concerning the current electricity price of the charging stations 33 can also enable a better determination of the expected occupancy of the charging stations 103a, 103b. By way of example, charging stations 103a, 103b having a low current electricity price can have a high expected occupancy. The program is subsequently continued in a step S27.

In step S27, depending on the expected occupancy determined, information concerning the expected occupancy of the charging stations 23 along the predefined route is provided for the driver. The information concerning the expected occupancy of the charging stations 23 makes it easier for the driver to select a charging point along the specified route for example if the driver would like to charge the vehicle 101 at a later point in time. If the expected occupancy of charging stations 103a, 103b on an imminent section of the route is high, for example, the driver can decide to charge the vehicle 101 at one of the nearest charging stations 103a, 103b having lower occupancy, even if the battery is not yet empty. Optionally, the driver can also deviate from the specified route in order to find charging stations 103a, 103b having a lower occupancy. This information can be displayed for example as a graphic for a dashboard and/or a central display unit and/or a head-up display and/or a smartphone. The program is subsequently continued in a step S29.

In step S29, a charging strategy for the predefined route is determined. The charging strategy can be determined on the basis of the traffic data 15 and the expected occupancy of the charging stations 103a, 103b. By way of example, a lower traffic density can be associated with a lower occupancy of the charging stations 103a, 103b and accordingly a shorter waiting time. Charging stations 103a, 103b situated on roads with a lower traffic density can be preferred for the determination of the charging strategy. If the traffic density changes during the route, for example on account of a traffic accident, the charging strategy can be determined anew depending on this change. If the expected occupancy of the charging stations 103a, 103b changes during the route, for example on account of the failure of a charging station 103a, 103b, the charging strategy can be determined anew depending on this change.

Taking account of other data, for example the data concerning the historical traffic density 17, can enable a better determination of the charging strategy. By way of example, charging stations 103a, 103b on roads with a lower historical traffic density at the point in time of arrival of the vehicle 101 can be preferred for the determination of the charging strategy.

The use of the weather data 16 can also enable a better determination of the charging strategy. By way of example, charging stations 103*a*, 103*b* situated on sections of the route with a good weather situation are preferred for the determination of the charging strategy. The data concerning a current location and/or consumption and/or speed and/or charging status of the vehicle 21 can also enable a better determination of the charging strategy. These data can be used for example for route planning based on the range of the vehicle battery. In this case, these data are used for example together with other data, such as e.g. the weather data 16, for the determination of an expected occupancy of charging stations 103*a*, 103*b* and of a charging strategy with the aim of making it possible to reduce the travel duration taking into consideration the range of the vehicle 101. The data concerning the historical occupancy of the charging stations 18 contain information containing an occupancy pattern of the charging stations 103*a*, 103*b* for example during different times of the day and/or on work days and/or on holidays. Charging stations 103*a*, 103*b* having a low historical occupancy at the point in time of arrival of the vehicle 101 can be preferred for the determination of the charging strategy. The data concerning the current occupancy of the charging stations 31 can be taken into account for a better determination of the charging strategy. Charging stations 103*a*, 103*b* that are situated in the vicinity of the vehicle 101 and have a low current occupancy can be taken into account for the determination of the charging strategy. The data concerning the charging power of the charging stations 32 can enable a better determination of the charging strategy. By way of example, charging stations 103*a*, 103*b* having a high charging power and a low expected occupancy can be preferred for the determination of the charging strategy. The data concerning the current electricity price of the charging stations 33 can enable a better determination of the charging strategy. Charging stations 103*a*, 103*b* having a low electricity price can be preferred for the determination of the charging strategy.

The aim of the charging strategy is to reduce the travel duration as much as possible for the specified route. The charging strategy offers the driver for example information concerning time-efficient charging of the vehicle battery taking account of the waiting time at the charging stations 103*a*, 103*b* and/or the battery charging time and/or the travel time to the charging stations 103*a*, 103*b*. The program is subsequently continued in a step S31.

In step S31, depending on the charging strategy determined, information concerning the charging strategy 24 is provided for the driver. The charging strategy offers the driver an indication concerning the charging of the vehicle battery, not only depending on the state of charge of the battery but also depending on the capacity utilization of the charging stations 103*a*, 103*b*. By way of example, instead of a driver who is driving on the interstate highway charging his/her vehicle 101 at a rapid charging station 103*a*, 103*b* having a high occupancy, more time can be saved by charging the vehicle 101 at a charging station 103*a*, 103*b* which is not situated directly on the interstate highway, but has a lower occupancy. The charging strategy makes possible for the driver both time-efficient and cost-effective charging of the vehicle 101. The provision of the information concerning the charging strategy 24 to the driver thus leads to the reduction of the required travel duration for reaching a predefined journey destination. A further advantage is that of enabling a homogeneous occupancy of the charging infrastructure. Furthermore, said information can comprise a proposal concerning a route change, such that the route has one or more proposed charging stations 103*a*, 103*b* as intermediate destinations.

Said information can be displayed for example as a graphic for a dashboard and/or a central display unit and/or a head-up display and/or a smartphone.

In a step S33, the program is ended and can optionally be started again in step S1.

Steps S7 to S23, and S27 are optional steps and therefore need not necessarily be implemented.

LIST OF REFERENCE SIGNS

S Starting point
D End point
101 Vehicle
102 Device
103*a*,103*b* Charging station
15 Traffic data
16 Weather data
17 Data concerning the historical traffic density
18 Data concerning the historical occupancy of the charging stations
21 Data concerning the current location and/or speed and/or consumption and/or state of charge of the vehicle
22 Information concerning the current occupancy of the charging stations
23 Information concerning the expected occupancy of the charging stations
24 Information concerning the charging strategy
25 Information concerning the current electricity price of the charging stations
31 Data concerning the current occupancy of the charging station
32 Data concerning a charging power of the charging stations
33 Data concerning a current electricity price of the charging stations
S1, . . . , S33 Program steps The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for route planning for a vehicle comprising
a processor;
a memory in communication with the processor, the memory storing a plurality of instructions executable by the processor to configure the device to:
provide traffic data that are representative of a current traffic density of a predefined route from a start point to an end point selected by a driver using the device, wherein
the current traffic density indicates a number of vehicles on a road;
provide a current occupancy of charging stations along the route;
determine an expected occupancy of the charging stations along the route depending on the traffic data and the current occupancy, wherein the expected occupancy is an occupancy of the charging stations at a calculated point in time of arrival of the vehicle at the respective charging station;

provide data concerning a historical occupancy of the charging stations along the route, wherein the data concerning the historical occupancy comprise information concerning an occupancy of the charging stations at past points in time;

determine a charging strategy depending on the traffic data and the determined expected occupancy of the charging stations, and the current occupancy of the charging stations, wherein the charging strategy is representative of information concerning a charging process of the vehicle at one or more of the charging stations along the route, and the expected occupancy of the charging stations and the charging strategy are determined depending on the data concerning the historical occupancy of the charging stations;

depending on the charging strategy determined, provide information concerning the charging strategy for the driver via a display of the device; and receive, via the device, a selection from the driver of a charging station of the one or more charging stations along the route based on the determined charging strategy.

2. The device according to claim 1, wherein the memory further comprises instructions executable by the processor to cause the device to:

depending on the data concerning the current occupancy of the charging stations, provide information concerning the current occupancy of the charging stations for the driver.

3. The device according to claim 1, wherein the memory further comprises instructions executable by the processor to cause the device to:

provide data concerning a charging power of the charging stations along the route via the charging stations, wherein the expected occupancy of the charging stations and the charging strategy are determined depending on the data concerning the charging power of the charging stations.

4. The device according to claim 1, wherein the memory further comprises instructions executable by the processor to cause the device to:

provide data concerning a current electricity price of the charging stations along the route via the charging stations, wherein the expected occupancy of the charging stations and the charging strategy are determined depending on the data concerning the current electricity price of the charging stations.

5. The device according to claim 4, wherein the memory further comprises instructions executable by the processor to cause the device to:

depending on the data concerning the current electricity price of the charging stations, provide information concerning the current electricity price of the charging stations for the driver.

6. The device according to claim 1, wherein the memory further comprises instructions executable by the processor to cause the device to:

depending on the expected occupancy determined, provide information concerning the expected occupancy of the charging stations for the driver.

7. The device according to claim 1, wherein the memory further comprises instructions executable by the processor to cause the device to:

provide data concerning a current occupancy of the charging stations along the route, wherein the expected occupancy of the charging stations and the charging strategy are determined depending on the data concerning the current occupancy of the charging stations.

8. The device according to claim 1, wherein the memory further comprises instructions executable by the processor to cause the device to:

provide data concerning a historical traffic density via a database, wherein the data concerning the historical traffic density comprise information concerning a traffic density along the route at past points in time, and the expected occupancy of the charging stations and the charging strategy are determined depending on the data concerning the historical traffic density.

9. The device according to claim 1, wherein the memory further comprises instructions executable by the processor to cause the device to:

provide data concerning a current location and/or consumption and/or speed and/or charging status of the vehicle, wherein the expected occupancy of the charging stations and the charging strategy are determined depending on the data concerning the current location and/or consumption and/or speed and/or charging status of the vehicle.

10. A non-transitory computer-readable medium comprising executable program code, when executed by a processor, causes the processor to carry out the acts of:

providing traffic data that are representative of a current traffic density of a predefined route from a start point to an end point selected by a driver, wherein the current traffic density indicates a number of vehicles on a road;

providing a current occupancy of charging stations along the route;

determining an expected occupancy of the charging stations along the route depending on the traffic data and the current occupancy, wherein the expected occupancy is an occupancy of the charging stations at a calculated point in time of arrival of the vehicle at the respective charging station;

providing data concerning a historical occupancy of the charging stations along the route, wherein the data concerning the historical occupancy comprise information concerning an occupancy of the charging stations at past points in time;

determining a charging strategy depending on the traffic data, the determined expected occupancy of the charging stations, and the current occupancy of the charging stations, wherein the charging strategy is representative of information concerning a charging process of the vehicle at one or more of the charging stations along the route, and the expected occupancy of the charging stations and the charging strategy are determined depending on the data concerning the historical occupancy of the charging stations;

depending on the charging strategy determined, providing information concerning the charging strategy for the driver via a display; and receiving a selection from the driver of a charging station of the one or more charging stations along the route based on the determined charging strategy.

11. The medium according to claim 10, further comprising additional executable program code to cause the processor to carry out the acts of:

providing data concerning a charging power of the charging stations along the route via the charging stations, wherein
the expected occupancy of the charging stations and the charging strategy are determined depending on the data concerning the charging power of the charging stations.

12. The medium according to claim 10, further comprising additional executable program code to cause the processor to carry out the acts of:

providing data concerning a current electricity price of the charging stations along the route via the charging stations, wherein
the expected occupancy of the charging stations and the charging strategy are determined depending on the data concerning the current electricity price of the charging stations.

13. The medium according to claim 12, further comprising additional executable program code to cause the processor to carry out the acts of:

depending on the data concerning the current electricity price of the charging stations, providing information concerning the current electricity price of the charging stations for the driver.

14. The medium according to claim 10, further comprising additional executable program code to cause the processor to carry out the acts of:

depending on the expected occupancy determined, providing information concerning the expected occupancy of the charging stations for the driver.

15. The medium according to claim 10, further comprising additional executable program code to cause the processor to carry out the acts of:

providing data concerning a current occupancy of the charging stations along the route, wherein
the expected occupancy of the charging stations and the charging strategy are determined depending on the data concerning the current occupancy of the charging stations.

16. The medium according to claim 10, further comprising additional executable program code to cause the processor to carry out the acts of:

providing data concerning a current location and/or consumption and/or speed and/or charging status of the vehicle, wherein
the expected occupancy of the charging stations and the charging strategy are determined depending on the data concerning the current location and/or consumption and/or speed and/or charging status of the vehicle.

17. The medium according to claim 10, further comprising additional executable program code to cause the processor to carry out the acts of:

depending on the data concerning the current occupancy of the charging stations, providing information concerning the current occupancy of the charging stations for the driver.

18. The medium according to claim 10, further comprising additional executable program code to cause the processor to carry out the acts of:

providing data concerning a historical traffic density via a database, wherein
the data concerning the historical traffic density comprise information concerning a traffic density along the route at past points in time, and
the expected occupancy of the charging stations and the charging strategy are determined depending on the data concerning the historical traffic density.

19. A device for route planning for a vehicle comprising a processor;

a memory in communication with the processor, the memory storing a plurality of instructions executable by the processor to configure the device to:

provide traffic data that are representative of a current traffic density of a predefined route from a start point to an end point selected by a driver using the device, wherein
the current traffic density indicates a number of vehicles on a road;

provide a current occupancy of charging stations along the route;

determine an expected occupancy of the charging stations along the route depending on the traffic data and the current occupancy, wherein
the expected occupancy is an occupancy of the charging stations at a calculated point in time of arrival of the vehicle at the respective charging station;

provide weather data that are representative of a weather situation along the route are provided;

determine a charging strategy depending on the traffic data and the determined expected occupancy of the charging stations, and the current occupancy of the charging stations, wherein
the charging strategy is representative of information concerning a charging process of the vehicle at one or more of the charging stations along the route, and
the expected occupancy of the charging stations and the charging strategy are determined depending on the weather data;

depending on the charging strategy determined, provide information concerning the charging strategy for the driver via a display of the device; and receive, via the device, a selection from the driver of a charging station of the one or more charging stations along the route based on the determined charging strategy.

* * * * *